F. B. RAE.
ELECTRICAL CONTROLLING SYSTEM.
APPLICATION FILED MAR. 19, 1917.
1,356,012.
Patented Oct. 19, 1920.
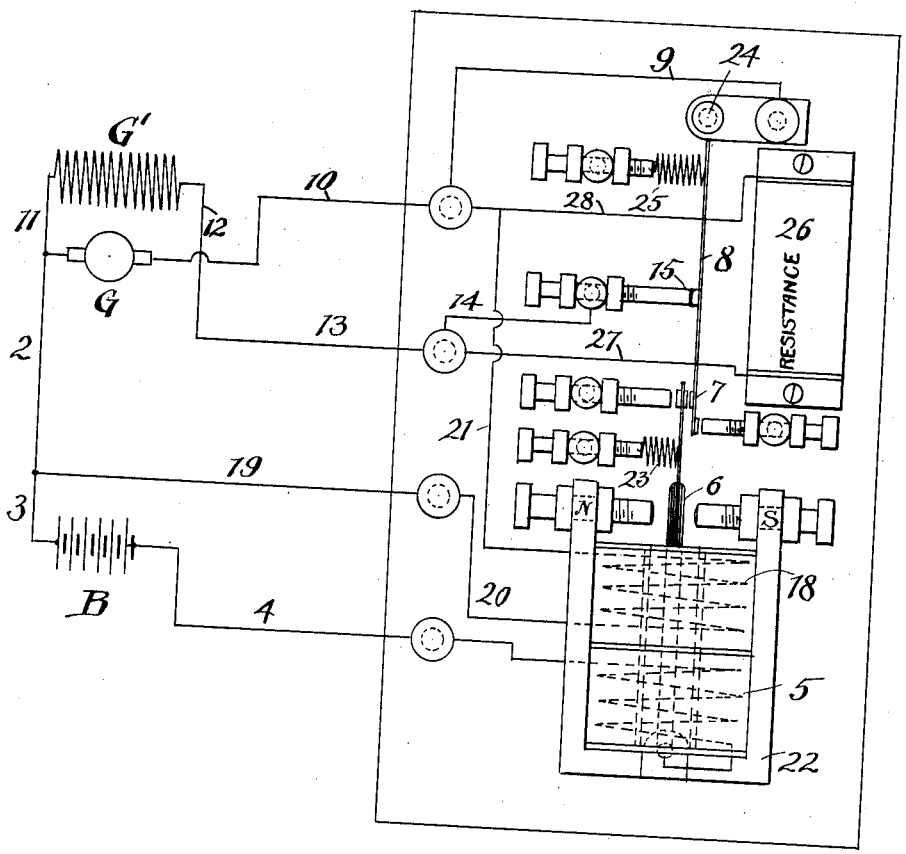
Inventor:
Frank B. Rae
By Thurston & Kwis
attys

UNITED STATES PATENT OFFICE.

FRANK B. RAE, OF CLEVELAND, OHIO.

ELECTRICAL CONTROLLING SYSTEM.

1,356,012.  Specification of Letters Patent.  Patented Oct. 19, 1920.

Application filed March 19, 1917. Serial No. 155,689.

*To all whom it may concern:*

Be it known that I, FRANK B. RAE, a citizen of the United States, residing at Cleveland, in the county of Cuyahoga and State of Ohio, have invented a certain new and useful Improvement in Electrical Controlling Systems, of which the following is a full, clear, and exact description.

This invention relates to an electrical system by which the charging of a battery by a generator is effectively controlled and regulated. The system is more particularly intended to be used in connection with a charging and lighting system for an automobile, wherein the generator is driven by the internal combustion engine of the automobile, the system being so arranged as to take care of the different speeds at which the engine is run and generally to prevent the charging of the battery except under proper conditions.

Generally speaking, the invention may be said to comprise the elements and combinations thereof set forth in the accompanying claims.

Reference should be had to the accompanying drawings forming a part of the specification, in which the figure shown is a diagrammatic representation showing the relation of the various instrumentalities of the system and their electrical connection.

In this electrical system, as in all other systems of this character, the result sought after is to automatically provide for the charging of the battery by the generator only when the voltage of the generator has reached a predetermined amount; further, to disconnect the battery from the generator at such times as the battery voltage may be higher than the generator either because of reduced speed of the generator or because of an overcharged condition of the battery; and furthermore, to prevent the generator from charging the battery when the generator voltage due to excess speed of the generator or otherwise passes above predetermined voltage at which it is desired to charge the battery. These desirable features are all accomplished in the system herein shown and described, and the system operates automatically to maintain the proper and desired conditions for charging the battery.

The generator is represented at G, and is provided with a shunt field winding G'. The battery is represented at B and is connected to one side of the generator by the wires 2 and 3. The battery is connected to the other side of the generator armature by the wire 4, coil 5, pivoted lever 6, contact lever 7, secondary lever 8, wire 9, and wire 10.

The shunt field winding is connected to one side of the generator armature by means of the wire 11, and is connected to the other side of the generator by means of wire 12, wire 13, wire 14, contact 15, secondary lever 8, wire 9, and wire 10.

The contact 15 is normally closed while the contact 7 is normally open, therefore, prior to starting the generator the shunt field winding is closed so as to provide field excitation as soon as the generator is started, while the main circuit between the generator and the battery is open, and remains so until the voltage of the generator reaches a predetermined amount at which time it is closed as will be later described.

A coil 18 is connected across the armature of the generator in shunt relation therewith, the current passing between the generator armature and the coil 18 being as follows: wire 2, wire 19, wire 20, coil 18, wire 21, and wire 10.

At 22 there is represented a polarized relay which consists of a permanently magnetized yoke having poles represented at N and S. Pivoted to the yoke of the polarized relay is the lever 6. This lever normally occupies a position substantially midway between the poles N and S, and is assisted to maintain its position by means of a spring 23 which is adjustable. The lever 6 as before described is at the point 7 adapted under certain conditions to make contact with a secondary lever 8. This lever 8 is adapted to make contact at 15 with the circuit which includes the shunt field winding of the generator, as previously described. The secondary lever 8 is pivotally mounted as indicated at 24, and is maintained in its desired and proper position by means of a retractile spring 25. The desired and normal position of the secondary lever 8 is maintained in contact at 15, but normally the contact at the point 7 is broken, the retractile spring 23 maintaining the lever 6 in such position as to normally accomplish this result.

Under certain conditions later to be explained, it will be desirable to place a resistance in series with the shunt field winding of the generator, but inasmuch as this is desirable only under certain conditions, this resistance should be arranged with relation to the shunt field winding circuit, so that it is placed in said circuit only when conditions require it, and should be removed from this circuit as soon as conditions are restored so as to make its presence in the shunt field circuit unnecessary.

Such a resistance is indicated at 26. This resistance is by wire 27 connected with the wire 13 of the field winding circuit, and wire 28 is connected with the wire 10 of the generator circuit.

The normal circuit of the generator field winding will be as previously explained, to wit, wire 11, to one side of the generator, and wire 12, wire 13, wire 14, contact 15, secondary lever 8. wire 9, and wire 10 to the other side of the generator circuit, this being the circuit because the current will tend to take the path of lowest resistance and therefore substantially no current will flow through the resistance. When, however, the contact at 15 is broken, as will be the case under certain conditions, the path of the current through the field winding of the generator with respect to the armature of the generator will be on one side through the wire 11 and on the other side through wire 12, wire 13, wire 27, resistance 26, wire 28 and wire 10.

Before the generator is put in operation the various instrumentalities of the system are in the relationship shown in the drawing, that is to say, the contact 7 is open and the contact 15 is closed. Under such circumstances as soon as the generator is started there is a current which passes through the field winding of the generator. The current from the generator will pass through the coil 18, which it will be recalled, is in shunt with the terminals of the armature of the generator. The current passing through the coil 18 will be in such a direction as to build up a flux tending to assist the S pole of the relay and tending to move the lever 6 against the action of the spring 23. The spring 23 is of such strength that the lever 6 will not be moved to close the contact 7 until the voltage of the generator has been built up to the predetermined normal.

When this happens the combined effect of the coil 18 and the S pole of the relay overcomes the spring 23 and the contact 7 is closed. This completes the main circuit, which includes the generator and the battery so that the battery is being charged.

It will be noted that the coil 5 is in series with the main circuit, and the coil 5 is so wound that when the battery is being charged the direction of the current through the coil 5 produces a flux that assists the S pole of the relay and the coil 18 so that the contact 7 is maintained closed, and will not be opened due to any ordinary jarring or vibration.

In the event that the voltage of the battery becomes higher than the voltage of the generator due to a reduction of speed of the generator, or for any other reason, current will flow from the battery and in such an event the current through the coil 5 will be reversed, which will build up a flux assisting the end pole of the relay. Furthermore, under such conditions the field produced by the coil 18 will be weakened due to the reduced voltage of the generator, and further taking into consideration the retractile force of the spring 23, the result will be that the lever 6 will be moved to break the contact 7, thus opening the main circuit between the battery and the generator. This circuit will remain open so long as the conditions just mentioned obtain, but as soon as the generator gains its normal speed or as soon as the battery is sufficiently discharged so that the voltage is below the voltage of the generator the condition in coil 5 will be reversed and the contact 7 will again be closed.

Under the usual and normal conditions which exist when the contact 7 is closed, the combined effect of the coils 5 and 18 and the S pole of the relay is not sufficient to overcome the spring 25 which controls the lever 8, and so the contact 15 remains closed. However, should the generator speed up so that the current from the same exceeds the predetermined normal at which it is desired to operate the generator, the flux in coils 5 and 18 in connection with the S pole of the relay, becomes sufficiently strong to move the lever 6 further and overcome the force of spring 25, which results in opening the contact 15 so that the normal circuit including the shunt field winding of the generator no longer obtains, but on the other hand, the resistance 26 is introduced in series in the shunt field winding circuit, as has previously been described. The introduction of the resistance 26 into the field winding of the generator automatically acts to reduce the voltage of the generator current in a manner which will be well understood, and the resistance 26 remains in circuit until the voltage of the generator current has decreased sufficiently so that the spring 25 may overcome the pulling effect of the coils 5, 18, and the S pole of the relay.

It will thus be seen that the polarized relay with the aid of the electromagnetic effects produced by the coils 5 and 18 controls the movement of the various lever contact members which make or break the variout circuits of the system. The use of the polarized relay has certain advantages over the use of a double spring arrangement to maintain the movable contact member 6 in its normal position. The coil 18 has only to be strong enough to overcome the spring 23, and effect a closing of the main circuit, then coil 5 assists coil 18 to hold contact member 6 in closed position.

Upon a reversal of the flow of current in the main circuit the coil 5 builds up a flux which opposes the S pole of the relay, and this, together with the action of spring 23, quickly moves the lever 6 and by it contact 7 is opened and under such conditions there is no positive spring action which has to be overcome; therefore, the system is very sensitive and operates to quickly open the main circuit under the conditions before mentioned.

Having thus described my invention, what I claim is:

1. In a regulating system, the combination of a generator and a battery, a main circuit including the generator and the battery, a permanent magnet, a movable contact carrying armature between the poles of said magnet, a movable contact carrying member, said armature and contact carrying member forming part of the main circuit, a coil associated with the armature and connected with the generator, said coil causing the armature and movable contact carrying members to engage.

2. In a regulating system, the combination of a generator having a shunt field winding and a battery of a main circuit including the generator and battery, a pair of movable contact carrying members which form a part of the main circuit, a magnet controlled by current from the generator said magnet operating upon one of said contact carrying members to move the said contact carrying members into engagement, a circuit including the generator field winding, a fixed contact which contact normally engages one of the movable contact carrying members so that the said movable contact carrying member forms a part of the said generator field circuit, a resistance included in said generator circuit but normally short circuited by the engagement between the said fixed contact and the movable contact member which engages therewith.

3. In a regulating system, the combination of a generator having a shunt field winding and a battery, a main circuit including the generator and battery, a polarized magnet, a movable armature associated with said magnet, a movable contact carrying member said armature and movable contact carrying member forming part of the main circuit, a coil connected in shunt with the generator and associated with the armature for influencing the armature to engage the said contact carrying member to close the main circuit, a circuit including the generator field winding, a fixed contact with which the said contact carrying member normally engages said contact and contact carrying member forming part of the circuit which includes the generator field winding, a resistance included in said generator field winding circuit, the said contact carrying member normally short circuiting said resistance, the armature and contact carrying member being movable to break the contact with said fixed contact while maintaining the contact between the armature and said contact carrying member.

In testimony whereof, I hereunto affix my signature.

FRANK B. RAE.